United States Patent [19]
Karayannis et al.

[11] 4,431,572
[45] Feb. 14, 1984

[54] RETREATING COMMINUTED OLEFIN POLYMERIZATION CATALYST WITH A TITANIUM (IV) COMPOUND, A CHLOROCARBON AND AN ESTER

[75] Inventors: Nicholas M. Karayannis, Naperville; Bryce V. Johnson, Elburn, both of Ill.

[73] Assignee: Standard Oil Company (Indiana), Chicago, Ill.

[21] Appl. No.: 378,406

[22] Filed: May 14, 1982

[51] Int. Cl.$^3$ ................................. C08F 4/64
[52] U.S. Cl. .................... 502/151; 526/124; 526/125; 502/154
[58] Field of Search .................... 152/429 B

[56] References Cited

U.S. PATENT DOCUMENTS

| | | | |
|---|---|---|---|
| 4,151,112 | 4/1979 | Wristers | 252/429 B |
| 4,168,361 | 9/1979 | Oda et al. | 252/429 B X |
| 4,242,230 | 12/1980 | Veno et al. | 252/429 B |
| 4,312,782 | 1/1982 | Mink et al. | 252/429 B |
| 4,325,836 | 4/1982 | Epstein et al. | 252/429 B |
| 4,329,253 | 5/1982 | Goodall et al. | 252/429 B |
| 4,353,813 | 10/1982 | Karayannis et al. | 252/429 B |
| 4,367,321 | 1/1983 | Bacnl et al. | 252/429 B X |

*Primary Examiner*—Patrick Garvin
*Attorney, Agent, or Firm*—Wallace L. Oliver; William T. McClain; William H. Magidson

[57] ABSTRACT

A comminuted, supported polymerization catalyst for alpha-olefins comprises (A) an organoaluminum compound and (B) a solid titanium-containing component formed by (1) comminuting a solid reaction product comprising (a) at least one halogen-containing compound of titanium (IV); (b) at least one electron donor; and (c) at least one hydrocarbon-insoluble magnesium-containing compound; and (2) retreating such comminuted product with (a) at least one halogen-containing compound of titanium (IV); (b) at least one chlorocarbon; and (c) at least one organic acid ester.

43 Claims, No Drawings

RETREATING COMMINUTED OLEFIN POLYMERIZATION CATALYST WITH A TITANIUM (IV) COMPOUND, A CHLOROCARBON AND AN ESTER

BACKGROUND OF THE INVENTION

Polymerization of alpha-olefins, such as ethylene, propylene and butene-1, to normally-solid, substantially crystalline polymers using catalyst compositions comprising transition metal and organoaluminum compounds is well known. Although many transition metal compounds have been disclosed as useful in such polymerizations, including salts of titanium, vanadium and zirconium, compounds of titanium predominate with tetravalent titanium (Ti(IV)) compounds typically proving most useful in ethylene polymerization and trivalent titanium (Ti(III)) compounds most useful in polymerization of propylene and higher alpha-olefins. Various forms of titanium components have been disclosed in both Ti(IV)- and Ti(III)-based compositions including a so-called "supported" titanium component. Supported titanium catalyst components have been disclosed in which titanium (either Ti(III) or Ti(IV)) is placed onto a metal oxide or metal halide support. One view of an advantage of supported titanium catalyst components is that in such components catalytically active titanium-containing sites are dispersed throughout the supported catalyst composition yielding more efficient use of the titanium content and resulting in higher overall catalytic activity, especially if based on titanium content.

Supported titanium catalyst components have been found most useful in ethylene polymerization such as described in U.S. Pat. No. 3,901,863. Until recently, however, supported titanium catalyst components have not been used substantially in commercial polymerization of propylene or higher alpha-olefins due to coproduction of high levels of noncrystalline or amorphous polymeric products. Production of such noncrystalline, amorphous products especially is detrimental in polymerization processes in which such noncrystalline products are not removed by solvent extraction.

Examples of nonsolvent processes are gas-phase and bulk processes. In gas-phase polymerization, solid polymer is formed directly on contact of gaseous monomer with a catalyst; while in a bulk process, polymer is formed in a liquid monomer medium. In either process solid polymer advantageously is not treated further with a hydrocarbon solvent to remove noncrystalline material. Even in a slurry process in which noncrystalline material can be removed, production of such noncrystalline material usually is minimized because of its lower economic value.

Supported olefin polymerization catalysts have been disclosed in which crystallinity-promoting components are incorporated. Such components can be electron donor compounds which are associated with titanium-containing supported catalyst complexes. Further, preparations of supported olefin polymerization catalysts have been disclosed in which the supported catalyst material is comminuted such as by ball-milling in order to increase catalyst activity. An example of such catalyst material is described in U.S. Pat. No. 4,277,370 incorporated by reference herein. However, it has been found that while comminuting such a catalyst component can increase activity, presumably by exposing more active sites, such a comminuted catalyst also can yield increased noncrystalline polymer products as evidenced by increased solubles and extractables.

Olefin polymerization catalysts having higher activity and yielding fewer undesirable by-products are always desirable. Many supported titanium-containing catalyst components which have been comminuted such as by ball-milling have been found to be active; however, such a comminuted supported catalyst component which also yields low amounts of noncrystalline polymeric by-products would be very desirable. A method to produce such a catalyst would be very useful in the olefin polymerization catalyst art.

An important commercial property of olefin polymers such as polypropylene is the morphology of powder product. Morphology is a term describing a combination of physical properties of a batch of polymer particles including average pore diameter, absence of very small particles ("fines") or large particles, and substantial uniformity of particles. One measurement used in evaluating morphology is bulk density. Typically, higher bulk density values are desired such as above about 22 pounds per cubic foot or higher. A catalyst which is active, and yields low amounts of amorphous products and a high bulk density powder would be very desirable.

SUMMARY OF THE INVENTION

A comminuted, supported polymerization catalyst for alpha-olefins comprises (A) an organoaluminum compound and (B) a solid titanium-containing component formed by (1) comminuting a solid reaction product comprising (a) at least one halogen-containing compound of titanium(IV); (b) at least one electron donor; and (c) at least one hydrocarbon-insoluble, magnesium-containing compound; and (2) retreating such comminuted product with (a) at least one halogen-containing compound of titanium(IV); (b) at least one chlorocarbon; and (c) at least one organic acid ester.

BRIEF DESCRIPTION OF THE INVENTION

It has been found that an improved comminuted supported titanium-containing catalyst component can be obtained by retreating such comminuted component with at least one halogen-containing compound of titanium(IV), at least one chlorocarbon and at least one organic acid ester.

The supported titanium-containing olefin polymerization catalyst component of this invention is formed by (1) comminuting the solid reaction product comprising (a) at least one halogen-containing compound of titanium(IV); (b) at least one organic electron donor; and (c) at least one hydrocarbon-insoluble, magnesium-containing compound; (2) reacting such comminuted product with (a) at least one halogen-containing compound of titanium(IV); and (b) at least one organic acid ester.

The hydrocarbon-insoluble, magnesium-containing compound can be a magnesium halide; a reaction product of a magnesium halide, such as $MgCl_2$ and $MgBr_2$, with an organic compound, such as an alcohol or an organic acid ester or with an organometallic compound of metals of Groups I–III. Preferably, however, the hydrocarbon-insoluble, magnesium-containing compound is based on at least one magnesium alcoholate which preferably has been pretreated with at least one modifier such as mineral acid and anhydrides of sulfur, organometallic chalcogenide derivative of hydrogen sulfide, and organic acids and esters thereof. Most preferably such magnesium-containing compound is the pretreatment product of at least one magnesium alcoholate, at least one Group II or IIIA metal alkyl and at least one modifier selected from the group consisting of mineral acids and anhydrides of sulfur, organometallic chalcogenic derivatives of hydrogen sulfide, organic acids and organic acid esters.

Titanium(IV) compounds useful in preparation of the stereospecific supported catalyst components of this invention are titanium halies and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly titanium tetrachloride ($TiCl_4$) are most preferred from the standpoint of attaining maximum activity and stereospecificity.

Organic electron donors useful in preparation of the stereospecific supported catalyst components of this invention are organic compounds containing one or more atoms of oxygen, nitrogen, sulfur, and phosphorus. Such compounds include organic acids, organic acid esters, alcohols, ethers, aldehydes, ketones, amines, amine oxides, amides, thiols, various phosphorus acid esters and amides, and the like. Mixtures of organic electron donors can be used if desired.

Specific examples of useful oxygen-containing electron donor compounds include organic acids and esters. These compounds also can be used in pretreating the magnesium-containing component as described below. Organic acids useful according to this invention are acids containing from 1 to about 20 carbon atoms and 1 to about 4 carboxyl groups. Such acids include aliphatic acids of 1 to about 20 carbon atoms; halogen-, hydroxyl-, oxo-, alkyl-, alkoxy-, aryl-, and aryloxy-substituted aliphatic acids of 1 to about 20 carbon atoms; aromatic acids of 7 to about 14 carbon atoms; and halogen-, hydroxyl-, alkyl-, alkoxy-, aryl-, and aryloxy-substituted aromatic acids of 7 to about 20 carbon atoms. Monocarboxylic acids are preferred over the polycarboxylic acids.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acid, veratric acid, asaronic acid, ethoxybenzoic acids, piperonylic acids, vanillic acid, cresotic acid, and everninic acid.

Organic acid esters useful as pretreatment components according to this invention include alkyl and haloalkyl esters of acids such as are described above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chloroethyl, bromoethyl, butyl, hexyl, cyclohexyl, octyl, chlorododecyl, phenyl, chlorophenyl, and naphthyl esters of acids such as are named above.

Preferred organic acids and esters are benzoic acid, halobenzoic acids and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use.

Specific examples of other useful oxygen-containing electron donors include aliphatic alcohols such as methanols, ethanols, propanols, butanols, pentanols, hexanols, and so forth; aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetra-hydroxybenzenes, naphthols, and dihydroxynaphthalenes; aralkyl alcohols such as benzyl alcohol, phenylethanols, phenylpropanols, phenylbutanols, phenylpentanols, phenylhexanols, and the like; alkaryl alcohols such as cresols, xylenols, ethylphenols, propylphenols, butylphenols, pentylphenols, hexylphenols, and the like; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetole, propylphenyl ether, butylphenyl ether, pentylphenyl ether, hexylphenyl ether and the like; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehye, butyraldehyde, valeraldehyde, caproaldehyde, and the like; benzylaldehyde, tolualdehyde, and alphatoluldehyde; and ketones such as acetone, diethyl ketone, methyl ethyl ketone, dipropyl ketone, dibutyl ketone, dipentyl ketone, dihexyl ketone, and the like; cyclobutanone, cyclopentanone, and cyclohexanone, and the like; acetophenone, propionphenone, butyrophenone, valerophenone, caprophenone, and the like; and diphenyl ketone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, tetraethylputrescine, diphenylmethylamine, triphenylamine, tritolylamine, diphenylbenzylamine, triphenylethylamine, triethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines benzylpyridines, methylpyrimidines, ethylpyrimidines, benzylpyrimidines, and the like.

Examples of useful sulfur-containing organic electron donors include thiols such as methanethiols, ethanethiols, ethanedithiols, propanethiols, butanethiols, butanedithiols, hexanethiols, and the like; thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like; aminoalcohols such as ethanolamine, hydroxyanilines, aminocresols, and the like; amine oxides such as lutidine-N-oxides and collidine-N-oxides; aminoethers such as bis(2-ethoxyethyl)amine; thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, triethyl trithiophosphite, hexamethylphosphoric triamide, and the like; and phosphine oxides such as triethylphosphine oxide, triphenylphosphine oxide, and the like.

From the standpoint of catalyst performance and preparative ease, the organic electron donors which are preferred according to this invention are $C_1$–$C_6$ alkyl esters of aromatic monocarboxylic acids and halogen-, hydroxyl-, oxo-, alkyl-, alkoxy-, aryl-, and aryloxy-substituted aromatic monocarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethy; bromobenzoate, butyl benzoate, isobutyl benzoate, hexyl benzoate, and cyclohexyl benzoate, are particularly preferred. Best results are attained through the use of ethyl benzoate. Other suitable esters include ethyl anisate and methyl-p-toluate.

In preparation of the stereospecific supported catalyst components of this invention, the magnesium-containing product, titanium(IV) component, and organic electron donor component are contacted in amounts such that the atomic ratio of titanium to metal in the magnesium-containing component employed in pretreatment is at least about 0.5:1. Preferably, this ratio ranges from about 0.5:1 to about 20:1. Greater amounts of titanium can be employed without adversely affecting catalyst component performance, but there typically is no need to exceed a titanium to magnesium ratio of about 20:1 as only a portion of the titanium is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

The sequence in which the components are contacted is not critical. Suitably, magnesium-containing product, titanium(IV) component, and electron donor component are contacted concurrently or two of the components are contacted followed by addition of the remaining component. From the standpoint of catalyst performance and preparative ease, the preferred preparative sequence is to combine the magnesium-containing product and titanium(IV) component and then add the organic electron donor component to the result.

According to the invention, the magnesium-containing product, titanium(IV), and electron donor components preferably are contacted in the presence of an inert hydrocarbon or halogenated hydrocarbon diluent, although other suitable techniques can be employed. Suitable diluents are materials which are substantially inert to the components employed and are liquid at the temperatures employed or can be maintained in the liquid state through the use of elevated pressure. As in the case of the diluents employed in pretreatment of magnesium alcoholates, it is desirable to purify any diluent to be employed to remove water, oxygen, carbon oxides, and other extraneous catalyst poisons. Examples of suitable diluents include materials such as are identified above as suitable pretreatment diluents, with nonane, 1,1,2-trichloroethane and carbon tetrachloride being preferred.

Reaction between the magnesium-containing product, titanium component, and organic electron donor is carried out at temperatures ranging from about 50° to about 170° C. Best results are obtained at about 130° to about 160° C. Generally the reaction is carried out over a period of several minutes to several hours, with about ½ to about 10 hours giving good results at economical rates. Most preferably, the reaction time ranges from about 1 to about 5 hours. When the components employed in preparation of the invented catalyst components are contacted according to the preferred preparative sequence, best results are attained when the magnesium-containing product and titanium(IV) component are combined at about ambient temperatue followed by addition of electron donor, at about ambient temperature and with agitation, over about ¼ to about 1½ hours and then heating at about 130° to about 160° C. for about ½ to about 3 hours with continued agitation.

The magnesium-containing product used in this invention preferably is obtained by contacting pretreatment components comprising (a) at least one magnesium alcoholate of the formula $Mg(OR^1)_n(OR^2)_{2-n}$ wherein $R^1$ and $R^2$ are identical or different hydrocarbyl radicals of 1 to about 20 carbon atoms and n ranges from 0 to 2; and (b) at least one Group II or IIIA metal alkyl containing 1 to about 20 carbon atoms per alkyl radical. Preferably, to maximize the activity of the catalysts, the pretreatment components further comprise (c) at least one modifier selected from the group consisting of mineral acids and anhydrides of sulfur, organometallic chalcogenide derivatives of hydrogen sulfide, organic acids and esters thereof.

Specific examples of magnesium alcoholates which are useful in forming a pretreated magnesium-containing component according to this invention include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, and $Mg(OC_{16}H_{33})(OC_{18}H_{37})$. Mixtures of magnesium alcoholates also can be employed if desired. Additionally, although not preferred, mixtures of magnesium alcoholates with minor amounts of other suitable metal salt such as alcoholates of lanthanum and the lanthanide metals, magnesium halides, hydroxyhalides, carboxylates, and so forth can be used.

From the standpoint of cost and availability, magnesium alcoholates which are preferred for use according to this invention are those of the formula $Mg(OR^1)_2$ wherein $R^1$ is as defined above. In terms of catalytic acitivity and stereospecificity, best results are achieved through the use of magnesium alcoholates of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms. Best results are attained through the use of magnesium ethoxide.

Useful Group II and IIIA metal alkyls are compounds of the formula $MR^3{}_m$ wherein M is a Group II or IIIA metal, each $R^3$ is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, $R^3$, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum.

Modifiers useful in pretreatment of a magnesium-containing component are mineral acids and anhydrides of sulfur, organometallic chalcogenide derivatives of hydrogen sulfide, organic acids, organic acid esters, and mixtures thereof.

Specific examples of useful mineral acids and anhydrides of sulfur include sulfur dioxide, sulfur trioxide, sulfuric acid, fuming sulfuric acid, and halosulfonic acids such as chlorosulfonic and fluorosulfonic acids. Hydrogen sulfide, which behaves as a weak acid in aqueous solution, also is considered a mineral acid of sulfur for purposes hereof. Also contemplated are the organometallic chalcogenide derivatives of hydrogen sulfide in which each hydrogen is replaced by an organosilicon, organogermanium, or organotin group wherein the organic radicals are selected from the group consisting of phenyl, alkyl-substituted phenyl, phenyl-substituted alkyl, and alkyl radicals, such alkyl radicals containing 1 to about 6 carbon atoms. Specific examples of useful organometallic chalcogenide pretreatment modifiers include bis(triphenyltin)sulfide, bis(tritolyltin)sulfide, bis(triethylphenyltin)sulfide, bis(trihexylphenyltin)sulfide, bis(triphenylmethyltin)sulfide, bis(triphenylethyltin)sulfide, bis(triphenylhexyltin)sulfide, bis(trimethyltin)sulfide, bis(triethyltin)sulfide, bis(tributyltin)sulfide, bis(trihexyltin)sulfide, and similar silicon- and germanium-containing compounds.

Among the mineral acids and anhydrides of sulfur and organometallic chalcogenide derivatives, sulfuric acid, fuming sulfuric acid, chlorosulfonic acid, and hydrogen sulfide are preferred because they lead to the best overall improvements in activities and stereospecificities.

Organic acids useful in pretreatment of a magnesium-containing component according to this invention are acids containing from 1 to about 20 carbon atoms and 1 to about 4 carboxyl groups. Such acids include aliphatic acids of 1 to about 20 carbon atoms; halogen-, hydroxyl-, oxo-, alkyl-, alkoxy-, aryl-, and aryloxy-substituted aliphatic acids of 1 to about 20 carbon atoms; aromatic acids of 7 to about 14 carbon atoms; and halogen-, hydroxyl-, alkyl-, alkoxy-, aryl-, and aryloxy-substituted aromatic acids of 7 to about 20 carbon atoms. Monocarboxylic acids are preferred over the polycarboxylic acids.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acid, veratric acid, asaronic acid, ethoxybenzoic acids, piperonylic acids, vanillic acid, cresotic acid, and everninic acid.

Organic acid esters useful as pretreatment components according to this invention include alkyl and haloalkyl esters of acids such as are described above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chloroethyl, bromoethyl, butyl, hexyl, cyclohexyl, octyl, chlorododecyl, phenyl, chlorophenyl, and naphthyl esters of acids such as are named above.

Preferred organic acids and esters are benzoic acid, halobenzoic acids and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use.

Mixtures of pretreatment modifiers which are preferred according to this invention are combinations of at least one of the above-described mineral acids or anhydrides of sulfur or organometallic chalcogenide derivatives with at least one of the above-described organic acids or organic acid esters. More preferred combinations are those containing at least one of the preferred sulfur-containing modifiers identified above (i.e., sulfuric acid, fuming sulfuric acid, chlorosulfonic acid, and hydrogen sulfide) and at least one of the preferred organic acids and esters identified above (i.e., benzoic acid, halobenzoic acids, and the $C_1$ to about $C_6$ alkyl esters thereof). Best results are obtained through the use of a combination of chlorosulfonic acid and methyl benzoate.

The pretreated magnesium-containing component is obtained by contacting components comprising at least one magnesium alcoholate and at least one Group II or IIIA metal alkyl. Preferably, at least one of the above-described pretreatment modifiers also is employed in preparation of the pretreatment product. The components are employed in amounts such that the atomic ratio of metal in the Group II or IIIA metal alkyl component to metal in the magnesium alcoholate component ranges from about 0.001:1 to about 1:1. Preferably, this ratio ranges from about 0.005:1 to about 0.5:1 as these amounts provide for good improvements in catalyst performance without hindering removal of unreacted Group II or IIIA metal alkyl from the reaction product which ultimately forms. In the preferred embodiment of this invention, wherein at least one pretreatment modifier is employed in preparation of the pretreated magnesium-containing product, the modifier is employed in an amount which is effective to improve catalyst component performance but not so great as to hinder pretreatment due to formation of excessive amounts of solids on reaction with the Group II or IIIA metal alkyl pretreatment component. Preferably, this amount ranges from about 0.001 to about 2 moles of pretreatment modifier per mole of Group II or IIIA metal alkyl component. Best results are attained when the molar ratio of pretreatment modifier to metal alkyl component ranges from about 0.005:1 to about 1:1, and particularly from about 0.01:1 to about 0.5:1. According to a particularly preferred embodiment of the invention wherein the modifier component employed is a mixture of at least one mineral acid or anhydride of sulfur or organometallic chalcogenide derivative and at least one organic acid or ester, it is preferred to employ from about 0.5 to about 20 moles of the organic acid or ester per mole of sulfur-containing modifier. More preferably, this ratio ranges from about 1:1 to about 15:1.

As indicated above the pretreatment product employed according to this invention is free of unreacted Group II or IIIA metal alkyl and is prepared by contacting the pretreatment components. Although not required, it is preferred to contact the components in the presence of an inert diluent to aid in conductance of heat evolved on reaction of the magnesium alcoholate and metal alkyl components away from the reaction product and further, because in the absence of a diluent the magnesium alcoholate and metal alkyl components typically react to form a sticky mass which can be difficult to handle in subsequent preparative manipulations. Although it is preferred to contact the pretreatment components in the presence of an inert diluent, other techniques such as pulverization of magnesium alcoholate in the presence of metal alkyl and, optionally, modifier component or a fluidized bed treatment of solid magnesium alcoholate with Group II or IIIA metal alkyl, and optionally, one or more modifiers also can be employed. Most preferably, Group II or IIIA metal alkyl dissolved in an inert diluent is added to a suspension of magnesium alcoholate in a diluent. Modifier components, when used, can be employed in any convenient form.

Diluents suitable for use in pretreatment include hydrocarbons and halogenated derivatives thereof that are substantially inert to the pretreatment components employed and, preferably, are liquid at pretreatment temperatures. It also is contemplated to conduct the pretreatment at elevated pressure so that lower-boiling diluents can be used even at higher temperatures. Examples of useful diluents include alkanes such a hexane, cyclohexane, ethylcyclohexane, heptane, octane, nonane, decane, undecane, and so forth; aromatics such as xylenes and ethylbenzene; and halogenated and hydrogenated aromatics such as chlorobenzene, o-dichlorobenzene, tetrahydronaphthalene, and decahydronaphthalene. Preferred diluents are the alkanes and especially hexane.

The sequence in which the pretreatment components are contacted is not critical. When pretreatment is carried out without the use of pretreatment modifier, the magnesium alcoholate and Group II or IIIA metal alkyl components are simply combined. When one or more modifier components are employed, magnesium alcoholate component, Group II or IIIA metal alkyl component, and modifier component can be contacted concurrently or two of the components can be brought together and then the third component added to the result. Best results are attained when the modifier component is added to a solution of Group II or IIIA metal alkyl component in a diluent and then the resulting solution is added to the magnesium alcoholate component.

Pretreatment according to this invention is carried out at temperatures ranging from about $-30°$ to about $130°$ C. Preferably, the pretreatment temperature ranges from about $0°$ to about $60°$ C., with about $10°$ to about $30°$ C. being more preferred from the standpoint of convenience. The time of pretreatment generally ranges from several minutes to several hours, with about 1 to about 10 hours being preferred. When pretreatment is conducted in the presence of an inert diluent, it is desirable to agitate the components during pretreatment to ensure thorough contacting of the components.

Following contacting of pretreatment components as described above, unreacted Group II or IIIA metal alkyl component is removed from the reaction product of the pretreatment components to avoid reduction of the titanium component employed in subsequent preparative steps. When pretreatment is conducted in the presence of an inert diluent, the reaction product preferably is separated from the diluent, for example, by filtration or decantation, and unreacted Group II or IIIA metal alkyl is removed therefrom by washing with hexane or another alkane.

The above-described pretreatment is conducted in the substantial absence of water, oxygen, carbon oxides, and other extraneous materials capable of adversely affecting the performance of the invented catalyst components. Such materials are conveniently excluded by carrying out the pretreatment in the presence of an inert gas such as nitrogen or argon, or by other suitable means. Optionally, all or part of the pretreatment may be conducted in the presence of one or more alpha-olefins which, when introduced into the preparative system in gaseous form, can serve to exclude catalyst poisons. The presence of one or more alpha-olefins during pretreatment also can result in improved stereospecificity. Useful alpha-olefins include ethylene, propylene, butene-1, pentene-1, 4-methylpentene-1, hexene-1, and mixtures thereof. Of course, any alpha-olefin employed during pretreatment should be of relatively high purity, for example, polymerization grade or higher. Other precautions which aid in excluding extraneous poisons include purification of any diluent to be employed, such as by percolation through molecular sieves and/or silica gel prior to use, and drying and/or heating of magnesium alcoholate pretreatment components.

As a result of the pretreatment in accordance with this invention, there is obtained a hydrocarbon-insoluble, magnesium-containing pretreatment product which can be reacted with at least one halogen-containing titanium(IV) compound and at least one organic electron donor to form a stereospecific supported catalyst component especially useful in the stereospecific polymerization of alpha-olefins of 3 or more carbon atoms.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin as described hereinabove. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired.

Although not required, the above-described solid reaction product may be washed with an inert liquid hydrocarbon or halogenated hydrocarbon before contact with a Lewis acid. Suitable inert liquids include those identified hereinabove as pretreatment and preparative diluents. If such a wash is conducted it is preferred to substantially remove the inert liquid prior to contacting the washed solid with Lewis acid.

The liquid Lewis acid employed according to the invention preferably is used neat although it also is contemplated to employ liquid Lewis acid diluted with up to about 40 vol.% of an inert solvent therefor. Suitable solvents include those materials useful as diluents in preparation of pretreatment product and supported catalyst component as described hereinabove. Of course, any such solvent should be purified prior to use. The amount of Lewis acid used, whether neat or diluted, is not critical. From a practical standpoint, however, the amount should be great enough to provide a high degree of contact between the solid and liquid, but not so great as to waste the Lewis acid or require excessively large vessels for the contacting. Most preferably, from about 3 to about 10 milliliters of Lewis acid are used for each gram of solid to be treated.

Temperature in the liquid Lewis acid-contacting step is at least high enough to avoid solidification of the Lewis acid employed, but not so high as to adversely affect ultimate catalyst component performance. Preferred temperatures range from about 0° to about 170° C. When $TiCl_4$ is used as the Lewis acid, temperatures of about 20° to about 135° C. are preferred as the same result in desirable improvements in catalytic performance while avoiding waste of $TiCl_4$ through vaporization thereof and exposure of catalyst components to conditions more severe than necessary.

The time of contact with liquid Lewis acid is not critical and generally ranges from several minutes to several hours. It is desirable to agitate the solid and Lewis acid during at least a substantial portion of this time to ensure a high degree of contact. Preferred contact times range from 1 to about 30 minutes as the same yield the desired improvements without occupying preparation equipment for undesirably lengthy periods of time.

As in preparation of the solid reaction product, the Lewis acid-contacting step according to this invention is conducted in the substantial absence of oxygen, water, carbon oxides and extraneous catalyst poisons. Such materials are excluded by any convenient manner as described hereinabove.

Following contacting with Lewis acid, solids are allowed to settle and supernatant is removed therefrom such as by filtration or decantation. One or more additional Lewis acid-contacting steps can be carried out with the same or different Lewis acid. In addition, a series of alternating Lewis acid and inert liquid hydrocarbon or halogenated hydrocarbon washes can be conducted if desired.

Prior to use in the polymerization of alpha-olefins, the catalyst components used in this invention are mechanically activated by comminution. Mechanical activation improves the polymerization performance of the invented catalyst components, whether or not treated with Lewis acid, in terms of both activity and susceptibility to modification by crystallinity-promoting modifiers; however, comminution typically forms a catalyst component which yields increased noncrystalline products. The preferred technique for mechanically activating the invented catalyst components is dry ball-milling, that is, ball-milling in substantial absence of inert diluent. However, good results also can be obtained by ball-milling in the presence of a minor amount of an inert diluent such as hexane or another alkane, as well as by other techniques. The above-described catalyst components can be comminuted in the presence of one or more organic electron donors of the general type employed in preparation of the catalyst components. Techniques of comminution by ball-milling generally are known in the art. Typically, titanium-containing catalyst component and hard, nonreactive balls, such as steel or burundum balls, are placed in a closed container which is agitated usually by rolling, shaking or rocking. Such comminution is continued for a few hours up to several days, typically about 12 to about 36 hours, until the catalyst component is ground to a desired particle size typically about 5 to about 50 microns. Since mechanical action of comminution can cause a temperature increase in the comminuting mixture, care should be taken to keep the temperature below the decomposition temperature of the catalyst component. Typically, the comminuting mixture should be kept at below about 50° C.

Optimum comminution techniques for a specific catalyst component can be determined by routine experimentation.

Optimum polymerization performance is attained by treating with Lewis acid and then mechanically activating. Treatment of mechanically activated catalyst component with Lewis acid alone is not preferred as it may result in agglomeration of the component and inferior polymerization performance.

According to this invention comminuted titanium-containing catalyst component is retreated by contact with a halide-containing titanium(IV) compound and a chlorocarbon and an ester.

Titanium(IV) compounds useful in retreatment are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired.

The titanium(IV) compounds used in this invention can be used in mixtures with corresponding silicon, germanium and tin compounds.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly titanium tetrachloride ($TiCl_4$) are preferred from the standpoint of attaining maximum activity and stereospecificity. The most preferred titanium(IV) halide for retreatment is titanium tetrachloride.

Suitable chlorocarbons useful for retreatment contain one to about 12 carbon atoms and from one to about 10 chlorine atoms. Examples of chlorocarbons include chloroform, methylene chloride, 1,2-dichloroethane, 1,1-dichloroethane, 1,1,2-trichloroethane, 1,1,1-trichloroethane, carbon tetrachloride, ethyl chloride, 1,1,2,2-tetrachloroethane, pentachloroethane, hexachloroethane, 1,1-dichloropropane, 1,2-dichloropropane, 1,3-dichloropropane, 2,2-dichloropropane, 1,1,1-trichloropropane, 1,1,2-trichloropropane, 1,1,3-trichloropropane, 1,2,3-trichloropropane, 1,1,1,2-tetrachloropropane, 1,1,2,2-tetrachloropropane, 1,1,1,2,3-pentachloropropane, 1,1,2,3,3-pentachloropropane, 2-methyl-1,2,3-trichloropropane, 1,1-dichlorobutane, 1,4-dichlorobutane, 1,1-dichloro-3-methylbutane, 1,2,3-trichlorobutane, 1,1,3-trichlorobutane, 1,1,1,2-tetrachlorobutane, 1,2,2,3-tetrachlorobutane, 1,1,2,3,4,4-hexachlorobutane, 1,1,2,2,3,4,4-heptachlorobutane, 1,1,2,3,4-pentachlorobutane, 2-methyl-2,3,3-trichlorobutane, 1,2-dichloropentane, 1,5-dichloropentane, 1,1,2,2-tetrachlorohexane, 1,2-dichlorohexane, 1,6-dichlorohexane, 3,4-dichloro-3,4-dimethylhexane and the like. Preferable chlorocarbons used in this invention include carbon tetrachloride, 1,1,2-trichloroethane and pentachloroethane.

Organic acid esters useful in retreatment are alkyl and haloalkyl esters of organic acids wherein the alkyl group or groups contain one to about twelve carbon atoms, and aryl and haloaryl esters of such acids wherein the aryl group or groups contain six to about ten carbon atoms. Specific examples of useful organic acid esters include the methyl, chloromethyl, ethyl, chloroethyl, bromoethyl, butyl, hexyl, cyclohexyl, octyl, chlorododecyl, phenyl, chlorophenyl, and naphthyl esters of organic acids. Organic acids from which such esters can be formed are acids containing from 1 to about 20 carbon atoms and 1 to about 4 carboxyl groups. Such acids include aliphatic acids of 1 to about 20 carbon atoms; halogen-, hydroxyl-, oxo-, alkyl-, alkoxy-, aryl-, and aryloxy-substituted aliphatic acids of 1 to about 20 carbon atoms; aromatic acids of 7 to about 14 carbon atoms; and halogen-, hydroxyl-, alkyl-, alkoxy-, aryl-, and aryloxy-substituted aromatic acids of 7 to about 20 carbon atoms. Monocarboxylic acids are preferred over the polycarboxylic acids.

Examples of aliphatic acids include saturated acids such as formic acid, acetic acid, oxalic acid, malonic acid, butyric acid, pivalic acid, valeric acid, glutaric acid, caproic acid, cyclohexane-carboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Examples of substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Examples of aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acid, veratric acid, asaronic acid, ethoxybenzoic acids, piperonylic acids, vanillic acid, cresotic acid, and everninic acid.

Preferred esters are esters of benzoic acid and halobenzoic acids wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use. Most preferable retreatment esters include ethyl benzoate, ethyl anisate and methyl-p-toluate.

In retreatment of a comminuted supported titanium-containing catalyst component according to this invention, a retreatment amount of titanium(IV) compound is contacted with the comminuted product. Typically, the atomic ratio of retreatment titanium(IV) to titanium contained in the comminuted catalyst component is about 50:1 to about 500:1 and preferably is about 200:1 to about 250:1. Preferably retreatment titanium(IV) compound is diluted in a liquid hydrocarbon during retreatment.

In retreatment, a chlorocarbon and an organic acid ester also are contacted with comminuted catalyst component. Typically, the ratio of moles of ester to gram-atom of titanium contained in such component is about 0.5:1 to about 10:1 and preferably is about 2:1 to about 4:1; and the ratio of moles of chlorocarbon to gram-atom of titanium contained in such component is about 40:1 to about 500:1 and preferably is about 200:1 to about 300:1. The chlorocarbon and organic acid ester can be diluted in a liquid hydrocarbon before retreatment. Although the titanium(IV) compound and chlorocarbon and organic acid ester can be combined before retreatment, the usual procedure is to contact the comminuted component first with the chlorocarbon then with the titanium(IV) compound in a diluent.

Although the chemical structure of the catalyst components described herein is not presently known, the components preferably contain from about 1 to about 6 wt.% titanium, from about 10 to about 25 wt.% magnesium, less than about 1 wt.% Group IIIA metal and from about 45 to about 65 wt.% halogen. From the standpoint of attaining maximum efficiency of titanium, catalyst components which are more preferred according to this invention contain from about 1.5 to about 3 wt.% titanium, from about 15 to about 20 wt.% magnesium, less than about 0.5 wt.% Group IIIA metal, and from about 50 to about 60 wt.% chlorine.

The catalysts of this invention comprise a stereospecific supported component as described above, and at least one organoaluminum activator. Preferably, the invented catalysts further comprise one or more crystallinity promoters capable of further improving catalyst stereospecificity. Suitable organoaluminum activators include trihydrocarbylaluminum compounds and dihydrocarbylaluminum hydrides having 1 to about 20 carbon atoms per hydrocarbyl radical. Specific examples of useful organoaluminum compounds include $Al(CH_3)_3$, $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$, $Al(C_{12}H_{25})_3$, $Al(CH_3)_2H$, $Al(C_2H_5)_2H$, $Al(C_3H_7)_2H$, $Al(C_4H_9)_2H$, $Al(C_5H_{11})_2H$, $Al(C_6H_{13})_2H$, $Al(C_8H_{17})_2H$, and $Al(C_{12}H_{25})_2H$. Mixtures also can be employed if desired. Preferred organoaluminum compounds are the trialkylaluminums containing 2 to about 6 carbon atoms per alkyl radical as these lead to best results in terms of activity and stereospecificity. Most preferably, the organoaluminum compound is triethylaluminum, triisobutylaluminum or a mixture thereof. The organoaluminum compound is employed in at least an amount which is effective to promote the polymerization activity of the supported component. Preferably the ratio of moles of organoaluminum component to gram-atom of titanium in the supported component is at least about 3:1. More preferably, this ratio ranges from about 5:1 to about 300:1, although substantially greater amounts of organoaluminum component also can be employed and often give highly desirable results.

Useful crystallinity promoters are materials capable of further improving the stereospecificity of the invented catalysts and include a wide variety of materials and combinations of materials. Examples of useful materials include a variety of organic electron donors, such as those employed in preparation of the invented, stereospecific supported catalyst components, and various inorganic mineral acids, anhydrides, and derivatives, including those employed in pretreatment as described hereinabove. The particular materials or combination to be employed can be readily determined by persons of skill in the art and the examples appearing hereinafter illustrate the use of various crystallinity promoters. Preferred materials are those capable of improving stereospecificity without leading to substantial decreases in activity. Examples of preferred crystallinity promoters include methyl-p-toluate, methyl anisate, ethyl benzoate, ethyl-p-anisate, ethyl pivalate, 2,2,6,6-tetramethylpiperidine, 2-benzylpyridine, 2-acetylpyridine, and combinations thereof.

Comminuted catalyst may be prepolymerized with an alpha-olefin before use as a polymerization catalyst component. In prepolymerization comminuted catalyst and an organoaluminum compound co-catalyst such as triethylaluminum are contacted with an alpha-olefin such as propylene under polymerization conditions, preferably in the presence of a modifier such as methyl-p-toluate and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particles morphology, activity and stereospecificity.

The above-described catalysts are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry, bulk, and vapor phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure at the polymerization temperature of the alpha-olefin to be polymerized.

The polymerization time is not critical and will generally range from about ½ to several hours in batch processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well known diluents. It often is desirable to purify the polymerization medium prior to use such as by distillation, percolation through molecular sieves, contacting with a compound such as an alkylaluminum compound capable of removing trace impurities, or by other suitable means. Examples of gas-phase polymerization processes in which the catalyst of this invention is useful are described in U.S. Pat. Nos. 3,957,448; 3,965,083; 3,971,768; 3,972,611; 4,129,701; 4,101,289; 3,652,527 and 4,003,712.

Irrespective of poymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Upon completion of polymerization, or when it is desired to terminate polymerization or deactivate the catalyst of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

The following examples illustate but do not limit the described invention.

EXAMPLES I-IV

(A) Preparation of Pretreated Magnesium-containing Component

Into a one-liter flask equipped with magnetic stirrer and maintained under nitrogen in a drybox were added 100 milliliters of dry n-hexane and 11.4 grams of anhydrous magnesium ethoxide (obtained from Dynamit Nobel) at ambient temperature. The resulting suspension was stirred and 20 milliliters of a mixture formed by combining 60 milliliters of a 25 wt.% solution of triethylaluminum (TEA) in dry n-hexane, 0.03 milliliter of chlorosulfonic acid and 0.2 milliliter of methyl benzoate were added dropwise to the stirred suspension over a period of about ¼ hour at ambient temperature. Stirring was continued for one hour following completion of the addition of TEA solution and then the solid reaction product was allowed to settle. The supernatant then was decanted and the solid was washed twice with 125-milliliter portions of dry n-hexane. The resulting pretreatment product then was suspended in 450 milliliters n-nonane. The atomic ratio of aluminum to magnesium employed in preparation of the pretreatment product was 0.15:1.

(B) Preparation of Supported Catalyst Component

Into a one-liter flask equipped as in (A) were added dropwise with stirring the suspension of pretreatment product prepared in (A) and 100 milliliters of titanium tetrachloride at ambient temperature. To the resulting mixture there was added dropwise a solution of 2.5 milliliters of ethyl benzoate in 50 milliliters n-nonane over a period of about ¼ hour at ambient temperature with stirring. After addition of the ethyl benzoate solution was completed, the resulting mixture was heated to 135°-140° C., stirred at this temperature for 1½ hours, and then allowed to cool to about 115° to 120° C. The supernatant liquid then was decanted and the remaining solid was washed four times with 150-milliliter portions of dry n-hexane. After the final wash, the solid was separated from the liquid by filtration and dried.

(C) Comminution of Supported Catalyst Component

A portion of the solid catalyst component prepared in (B) and 80 stainless steel balls having a diameter of 10 millimeters were placed in a Roalox, burundum-fortified porcelain mill jar (manufactured by A. Daigger Company) having a capacity of ¼ quart (about 280 milliliters) and milled in a rotary ball mill (manufactured by Paul O. Abbe, Inc., motor speed=1725 rpm) for 16 hours at ambient temperature under an atmosphere of dry nitrogen. The solid was sieved to remove all particles which could not pass through a 200 mesh (U.S. Sieve Series) sieve.

The atomic ratio of titanium employed in (B) to magnesium employed in (A) was 4.6:1 and the ratio of ethyl benzoate to titanium was 0.03 mole per gram-atom.

(D) Retreatment of Comminuted Catalyst Component

A 7.7-gram portion of the solid obtained from (C) was mixed with 75.9 milliliters of titanium tetrachloride and 75.9 milliliters of carbon tetrachloride (spectrograde). After 2.07 milliliters of ethyl benzoate were added dropwise to this mixture with stirring, the resulting suspension was heated to 95° C. for 1.5 hours while stirring. After solid product was allowed to settle, supernatant liquid was removed by decantation and the residue washed four times with 50-milliliter portions of n-hexane. The remaining solid was suspended in 75 milliliters of hexane.

(E) Propylene Polymerization

A series of bulk propylene polymerizations were conducted using aliquots of titanium-containing catalyst components prepared above. Triethylaluminum (TEA), ethyl benzoate (EB), ethyl anisate (EA) and 0.021 gram of titanium-containing catalyst component were combined in a drybox under nitrogen and flushed into a two-liter Parr reactor in 300 milliliters of propylene. After an additional 1000 milliliters of propylene and 10 psig of hydrogen were charged to the reactor, the reactor was closed and polymerization conducted at 71° C. for two hours. After the reactor was cooled and vented, the resulting solid polymer was air dried overnight and then weighed. Results are shown in Table I.

TABLE I

| Molar Ratio | Residence Time (hours) | Yield (gram/gram of titanium componet) | Extractables (wt. %) | Bulk Density (lbs/ft³) |
|---|---|---|---|---|
| TEA/Ti/EB/EA | | | | |
| 190/1/14.5/40.0 | 2 | 4,912 | 2.8 | 26.9 |
| 200/1/14.5/40.0 | 2 | 4,735 | 3.0 | 27.4 |
| TEA/Ti/MpT/EA | | | | |
| 200/1/58.3/— | 2 | 12,737 | 6.2 | 26.0 |
| 200/1/18.7/40.0 | 2 | 10,531 | 4.1 | 27.2 |
| 300/1/24.5/44.0 | 2 | 15,312 | 5.3 | 26.4 |
| 300/1/29.2/48.0 | 2 | 12,505 | 4.5 | 28.3 |
| 200/1/18.7/40.0 | 1 | 8,488 | 3.7 | 28.4 |
| 180/1/18.7/40.0 | 1 | 6,566 | 3.1 | 27.4 |
| 300/1/29.2/48.0 | 1 | 10,452 | 4.1 | 28.2 |
| 300/1/29.2/52.0 | 1 | 9,491 | 3.4 | 27.3 |
| 300/1/35.3/48.0 | 1 | 11,240 | 3.1 | 27.4 |
| 300/1/41.2/48.0 | 1 | 8,356 | 2.9 | 26.8 |
| 360/1/47.1/52.0 | 1 | 8,104 | 3.4 | 27.4 |
| 300/1/37.7/40.0 | 1 | 3,652 | 1.7 | 26.9 |

EXAMPLE II

Another series of polymerizations was conducted as described in Example I using a titanium-containing component prepared as described therein except that 7.2 grams of comminuted product, 72 milliliters of titanium tetrachloride, 72 milliliters of carbon tetrachloride and 1.94 milliliters of ethyl benzoate were used in the retreatment Step D. Methy-p-toluate (MpT), a 1:1 complex of MpT and aluminum tetrachloride (MpT-AlCl₃), and ethyl anisate (EA) were used as catalyst modifers as noted. Polymerization results are shown in Table II.

TABLE II

| Molar Ratio | Residence Time (hours) | Yield (gram/gram of titanium componet) | Extractables (wt. %) | Bulk Density (lbs/ft³) |
|---|---|---|---|---|
| TEA/Ti/MpT/EA | | | | |
| 300/1/37.7/40.0 | 2 | 4,358 | 2.3 | 27.2 |
| 360/1/37.7/40.0 | 2 | 4,533 | 3.5 | 26.6 |
| 300/1/18.8/40.0 | 2 | 11,744 | 3.9 | 25.2 |
| 300/1/23.5/40.0 | 2 | 8,811 | 3.4 | 25.4 |
| 400/1/37.7/40.0 | 2 | 9,605 | 3.4 | 26.4 |
| 400/1/37.7/40.0 | 1 | 8,677 | 3.2 | 27.1 |
| TEA/Ti/MpT.AlCl₃ | | | | |
| 263/1/59.8 (2) | 1 | 12,883 | 3.5 | 28.2 |
| 263/1/82.5 (2) | 1 | 8,680 | 2.4 | 28.1 |
| 300/1/68.3 (1) | 1 | 14,589 | 3.8 | 28.2 |
| 350/1/85.2 (3) | 1 | 11,262 | 4.4 | 27.4 |
| 350/1/85.2 (3) | 2 | 19,656 | 4.2 | 27.6 |
| 350/1/79.7 (3) | 2 | 25,416 | 6.0 | 26.6 |
| 350/1/90.7 (3) | 2 | 15,168 | 3.5 | 28.3 |

(1) 0.021 gram of titanium-containing component used
(2) 0.024 gram of titanium-containing component used
(3) 0.018 gram of titanium-containing component used

EXAMPLE III

A series of polymerizations was conducted using a catalyst prepared in a manner similar to Example I except that the solid from Step A was suspended in a mixture of 450 milliliters of n-nonane and 1.9 milliliters of benzoyl chloride and refluxed at 148° C. for three hours. Subsequently, 100 milliliters of titanium tetrachloride were added dropwise and the resulting mixture was refluxed at 144° C. for 1.5 hours. The resulting solid was allowed to settle, the supernatant liquid was removed and the solid washed four times with 25-milliliter portions of hexane. In Step C the solid was ball-milled for 64 hours.

In Step D 6.16 grams of comminuted and sieved solid was suspended in a mixture of 120 milliliters of pentachloroethane and 1.7 milliliters of ethylbenzoate. After 55 milliliters of titanium tetrachloride was added dropwise with stirring, the resulting mixture was stirred at 140° C. for 1.5 hours. The resulting solid was allowed to settle, supernatant liquid was removed and the solid was washed four times with 125-milliliter portions of hexane. The solid was filtered and dried. A series of bulk and slurry polymerizations was performed. One-hour bulk polymerizations were conducted as described in Example I and the results are shown in Table III. Slurry polymerizations were conducted in a two-liter Parr reactor at 160° F. in 1000 milliliters of hexane for two hours using 150 psig of propylene, 0.040 grams of titanium-containing catalyst component and 270 milliliters of hydrogen. Triethylaluminum was used as a co-catalyst. After each two-hour run, solid polypropylene was removed from the reactor, filtered, dried and weighed. Hexane solubles were determined by evaporation of the filtrate to dryness and weighing the residue. Results are shown in Table IV.

TABLE III

| Molar Ratio | Yield | Extractables (wt. %) | Bulk Density (lbs/ft³) |
|---|---|---|---|
| TEA/Ti/MpT.AlCl₃ (1) | | | |
| 205/1/49.0 | 16,296 | 3.7 | 25.2 |
| 205/1/57.4 | 14,376 | 1.9 | 23.7 |
| 205/1/67.6 | 9,920 | — | 23.5 |

TABLE III-continued

| Molar Ratio | Yield | Extractables (wt. %) | Bulk Density (lbs/ft³) |
|---|---|---|---|
| 205/1/57.4 | 11,740 | — | 24.4 |
| 200/1/57.4 | 13,188 | — | 25.4 |
| 205/1/57.4 | 15,516 | — | 24.7 |

(1) 0.025 gram of titanium-containing component used; 15 psig hydrogen used.

TABLE IV

| Molar Ratio of | Yield (grams/gram of titanium component) | Solubles (wt. %) | Bulk Density (lbs/ft³) |
|---|---|---|---|
| TEA/Ti/MpT | | | |
| 100/1/33.3 | 3,997 | 3.1 | 20.7 |
| 200/1/57 | 4,363 | 3.3 | 23.3 |
| TEA/Ti/AlCl₃.MpT/MpT | | | |
| 100/1/28.7/14.3 | 5,513 | 2.2 | 24.1 |
| 150/1/33.3/8.3 | 4,011 | 2.3 | 24.9 |
| TEA/Ti/AlCl₃.MpT/EA | | | |
| 100/1/33.3/8.3 | 6,094 | 2.5 | 25.7 |
| TEA/Ti/AlCl₃.MpT | | | |
| 100/1/25 | 6,865 | 2.3 | 25.5 |
| 100/1/33.3 | 8,065 | 3.3 | 24.0 |
| 100/1/33.3 | 11,887 | 3.7 | 25.5 |
| 100/1/40 | 6,174 | 2.5 | 23.5 |
| 150/1/43 | 6,963 | 2.3 | 25.9 |

EXAMPLEs IV–VII

Solid pretreated magnesium-containing component, prepared according to Step A of Example I, was suspended in a mixture of 114 milliliters each of titanium tetrachloride, carbon tetrachloride and 1,1,2-trichloroethane and stirred while three milliliters of ethylbenzoate were added dropwise at ambient temperature. After the resulting mixture was heated to 95° C. for 1.5 hours with stirring, solid was allowed to settle, supernatant liquid removed and the solid washed once with 150 milliliters of hexane. Four catalyst component samples were prepared in accordance with this procedure and designated Examples IV, V, VI and VII respectively. Examples IV and V were made starting with 11.2 grams of magnesium ethoxide in Step A while Examples VI and VII were six-fold scale-up preparations. Elemental analysis of these four catalyst components are as follows:

| Example | Ti (wt. %) | Mg (wt. %) | Cl (wt.%) |
|---|---|---|---|
| IV | 1.91 | 15.8 | 51.1 |
| V | 1.95 | 15.4 | 50.6 |
| VI | 2.22 | 16.5 | 53.8 |
| VII | 2.51 | 16.3 | 52.0 |

Bulk polymerization tests were performed using the catalyst components of Examples IV to VII. Various conditions and modifier packages were used in these polymerizations. Results obtained therefrom are shown in Tables V to VIII.

Abbreviations used in these tables are: TEA=triethylaluminum; EB=ethylbenzoate; EA=ethylanisate; TCE=1,1,2-trichloroethane; MpT=methyl-p-toluate; MpT:AlCl₃=1:1 complex of MpT and aluminum trichloride. The polymerization conditions were: temperature=71° C.; pressure=480 psig; 1300 milliliters of propylene; 30 psig of hydrogen; and two-hour residence time.

TABLE V

Example IV (1)

| Molar Ratio | Residence Time (hours) | Yield (grams/gram of titanium or component) |
|---|---|---|
| TEA/EB/EA | | |
| 283/1/35.5/37.7 | 2 | 4,831 |
| TEA/Ti/MpT.AlCl₃ | | |
| 283/1/64.4 | 2 | 17,227 |
| 283/1/64.4 | 1 | 15,639 |
| 283/1/68.8 | 2 | 21,096 |
| 283/1/68.8 | 1 | 13,909 |
| 283/1/73.2 | 2 | 23,189 |
| 283/1/73.2 | 1 | 13,637 |
| 283/1/77.7 | 2 | 18,809 |
| 283/1/77.7 | 1 | 14,196 |
| 302/1/82.1 | 2 | 19,885 |
| 302/1/82.1 | 1 | 12,691 |
| 320/1/88.8 | 2 | 17,952 |
| 320/1/88.8 | 1 | 12,551 |
| 320/1/99.8 | 2 | 14,640 |
| 320/1/133.2 | 2 | 10,553 |
| TEA/Ti/MpT.AlCl₃/EA | | |
| 283/1/73.2/18.8 | 2 | 13,880 |
| TEA/Ti/MpT.AlCl₃/TCE | | |
| 283/1/73.2/7.8 | 2 | 18,519 |
| 283/1/73.2/13.1 | 2 | 17,230 |

| Molar Ratio | Extractables (wt. %) | Bulk Density (lbs/ft³) |
|---|---|---|
| TEA/EB/EA | | |
| 283/1/35.5/37.7 | 2.4 | 26.4 |
| TEA/Ti/MpT.AlCl₃ | | |
| 283/1/64.4 | 3.6 | 26.9 |
| 283/1/64.4 | 2.8 | 27.3 |
| 283/1/68.8 | 3.7 | 27.7 |
| 283/1/68.8 | 2.8 | 27.0 |
| 283/1/73.2 | 3.4 | 28.1 |
| 283/1/73.2 | 2.6 | 27.2 |
| 283/1/77.7 | 2.5 | 28.3 |
| 283/1/77.7 | 2.5 | 27.6 |
| 302/1/82.1 | 3.0 | 27.8 |
| 302/1/82.1 | 2.5 | 27.3 |
| 320/1/88.8 | 2.7 | 28.2 |
| 320/1/88.8 | 2.3 | 27.7 |
| 320/1/99.8 | 2.1 | 27.7 |
| 320/1/133.2 | 1.8 | 25.6 |
| TEA/Ti/MpT.AlCl₃/EA | | |
| 283/1/73.2/18.8 | 2.2 | 27.8 |
| TEA/Ti/MpT.AlCl₃/TCE | | |
| 283/1/73.2/7.8 | 3.7 | 25.9 |
| 283/1/73.2/13.1 | 3.9 | 28.4 |

(1) 0.021 gram of titanium-containing component used

TABLE VI

Example V

| Molar Ratio | Yield (grams/gram of titanium component) | Extractables (wt. %) | Bulk Density (lbs/ft³) |
|---|---|---|---|
| TEA/Ti/MpT/EA | | | |
| (1)277/1/34.8/36.9 | 5,628 | 2.1 | 29.0 |
| TEA/Ti/MpT.AlCl₃ | | | |
| (1)277/1/76.1 | 19,811 | 3.0 | 28.8 |
| (1)314/1/97.7 | 15,926 | 2.7 | 30.0 |
| (2)284/1/76.1 | 30,056 | 4.2 | 29.2 |
| (2)310/1/97.7 | 17,370 | 2.7 | 28.0 |

(1) 0.021 gram of titanium-containing component used
(2) 0.015 gram of titanium-containing component used

TABLE VII

Example VI

| Molar Ratio (1) | Residence Time (hours) | Yield (grams/gram of titanium component) | Extractable (wt. %) |
|---|---|---|---|
| TEA/Ti/EB/EA | | | |
| 315/1/39.6/42.0 | 2 | 14,236 | 2.6 |
| TEA/Ti/MpT.AlCl$_3$ | | | |
| 315/1/71.7 | 1 | 12,328 | 3.8 |
| 315/1/71.7 | 2 | 22,188 | 3.4 |
| 315/1/76.7 | 1 | 18,115 | 3.8 |
| 315/1/76.7 | 2 | 21,961 | 3.4 |

(1) 0.020 gram of titanium-containing component used

TABLE VIII

Example VII

| Molar Ratio | Yield (grams/gram of titanium component) | Extractables (wt. %) | Bulk Density (lbs/ft$^3$) |
|---|---|---|---|
| TEA/Ti/MpT.AlCl$_3$ (1) | | | |
| 215/1/55.7 | 16,181 | 3.0 | 26.7 |
| 215/1/59.1 | 22,250 | 3.9 | 27.3 |
| TEA/Ti/MpT.AlCl$_3$/MpT (2) | | | |
| 158/1/41.1/19.2 | 17,800 | 2.8 | 27.2 |
| 172/1/34.0/16.6 | 25,428 | 4.6 | 27.0 |

(1) 0.021 gram of titanium-containing component used
(2) 0.015 gram of titanium-containing component used The data show that olefin polymerization catalyst prepared according to the invention is active while maintaining low amounts of amorphous product and high bulk density.

What is claimed is:

1. A polymerization catalyst for alpha-olefins comprising (A) an organoaluminum compound and (B) a solid, titanium-containing component formed by
   (1) comminuting a solid reaction product comprising
      (a) at least one halogen-containing compound of titanium(IV);
      (b) at least one electron donor containing at least one atom of oxygen, nitrogen, sulfur, or phosphorus; and
      (c) at least one hydrocarbon-insoluble, magnesium-containing compound; and
   (2) retreating such comminuted product with
      (a) at least one halogen-containing compound of titanium(IV);
      (b) at least one chlorocarbon; and
      (c) at least one carboxylic organic acid ester.

2. The catalyst of claim 1 wherein retreatment component (2) (a) is titanium tetrachloride.

3. The catalyst of claim 1 wherein retreatment component (2) (b) is a chlorocarbon containing one to about 12 carbon atoms and from one to about 10 chlorine atoms.

4. The catalyst of claim 3 wherein the chlorocarbon is carbon tetrachloride, 1,1,2-trichloroethane or pentachloroethane.

5. The catalyst of claim 1 wherein retreatment component (2) (c) is an alkyl, haloalkyl, aryl or haloaryl ester of an aliphatic or aryl organic acid.

6. The catalyst of claim 2 or 3 wherein the retreatment component (2) (c) is ethyl benzoate, ethyl anisate or methyl-p-toluate.

7. The catalyst of claim 1 wherein the solid titanium component is comminuted by ball-milling.

8. The catalyst of claim 1 wherein the magnesium-containing compound (1) (c) is a pretreatment product of components comprising (i) at least one magnesium alcoholate; and (ii) at least one Group II or Group IIIA metal alkyl.

9. The catalyst of claim 1 wherein the magnesium-containing component (1) (c) is (i) a magnesium halide or (ii) a reaction product of a magnesium halide with an organometallic compound of Groups I–III metals.

10. The catalyst of claim 1 wherein the molar ratio of electron donor (1) (b) to titanium(IV) compound (1) (a) is about 0.001:1 to about 1:1 and the atomic ratio of titanium in (1) (a) to magnesium in (1) (c) is at least about 0.5:1.

11. The catalyst of claim 1 wherein component (1) (a) comprises titanium tetrachloride.

12. The catalyst of claim 1 wherein component (1) (b) comprises a $C_1$–$C_6$ alkyl ester of an aromatic monocarboxylic acid or of an aromatic monocarboxylic acid substituted with at least one halogen, hydroxyl, oxo, alkyl, alkoxy, aryl or aryloxy substituent.

13. The catalyst of claim 1 wherein the atomic ratio of retreatment titanium(IV) (2) (a) to titanium contained in the comminuted product is about 50:1 to about 500:1, the ratio of moles of organic acid ester to gram-atom of titanium contained in the comminuted product is about 0.5:1 to about 10:1, and the ratio of moles of chlorocarbon to gram-atom of titanium contained in the comminuted product is about 40:1 to about 500:1.

14. A polymerization catalyst for alpha-olefins comprising (A) an organoaluminum compound and (B) a solid, titanium-containing component formed by
   (1) comminuting a solid reaction product comprising
      (a) at least one halogen-containing compound of titanium(IV);
      (b) at least one electron donor containing at least one atom of oxygen, nitrogen, sulfur or phosphorus; and
      (c) at least one hydrocarbon-insoluble, magnesium-containing pretreatment product comprising
         (i) at least one magnesium alcoholate; and
         (ii) at least one Group II or Group IIIA metal alkyl; and
   (2) retreating such comminuted product with
      (a) at least one halogen-containing compound of titanium(IV);
      (b) at least one chlorocarbon; and
      (c) at least one carboxylic organic acid ester.

15. The catalyst of claim 14 wherein the retreatment titanium(IV) compound (2) (a) comprises titanium tetrachloride.

16. The catalyst of claim 14 wherein the retreatment chlorocarbon (2) (b) contains one to about 12 crbon atoms and one to about 10 chlorine atoms.

17. The catalyst of claim 15 wherein the retreatment chlorocarbon (2) (b) is carbon tetrachloride, 1,1,2-trichloroethane or pentachloroethane.

18. The catalyst of claim 14 wherein the retreatment organic acid ester (2) (c) is an alkyl, haloalkyl, aryl or haloaryl ester of an aliphatic or aryl organic acid.

19. The catalyst of claims 15 or 17 wherein the retreatment organic acid ester (2) (c) is ethyl benzoate, ethyl anisate or methyl-p-toluate.

20. The catalyst of claim 14 wherein the solid titanium component is comminuted by ball-milling.

21. The catalyst of claim 14 wherein the titanium(IV) compound (1) (a) is titanium tetrachloride.

22. The catalyst of claim 14 wherein the electron donor (1) (b) comprises an alkyl ester of benzoic acid or an alkyl- or halo-substituted benzoic acid wherein the alkyl radicals contain one to about six carbon atoms.

23. The catalyst of claim 14 wherein the electron donor (1) (b) comprises methyl benzoate.

24. The catalyst of claim 14 wherein component (1) (c) (ii) comprises a compound of the formula $MR^3{}_m$ wherein M is aluminum, magnesium, or zinc, each $R^3$ is independently an alkyl radical of 1 to about 20 carbon atoms, and m corresponds to the valence of M.

25. The catalyst of claim 14 wherein component (1) (c) (i) comprises a compound of the formula $Mg(OR^1)_n(OR^2)_{2-n}$ wherein $R^1$ and $R^2$ are identical or different hydrocarbyl radicals of 1 to about 20 carbon atoms and n ranges from 0 to 2.

26. The catalyst of claim 14 wherein magnesium-containing compound (1) (c) further includes at least one pretreatment modifier selected from the group consisting of mineral acids and anhydrides of sulfur, organometallic chalcogenide derivatives of hydrogen sulfide in which each hydrogen is replaced by an organosilicon, organogermanium or organotin group wherein the organic radicals are selected from the group consisting of phenyl, alkyl-substituted phenyl, phenyl-substituted alkyl and alkyl radicals, said alkyl radicals containing 1 to about 6 carbon atoms, organic acids containing 1 to about 20 carbon atoms and 1 to about 4 carboxyl groups and $C_1$ to about $C_{12}$ alkyl and haloalkyl and $C_6$ to about $C_{10}$ aryl and haloaryl esters of said organic acids.

27. The catalyst of claim 26 wherein the pretreatment modifier comprises methyl benzoate, chlorosulfonic acid or a mixture thereof.

28. The catalyst of claim 26 wherein component (1) (b) comprises an alkyl ester of benzoic acid or a halobenzoic acid, said alkyl radical containing 1 to about 6 carbon atoms.

29. The catalyst of claim 26 wherein component (1) (c) (ii) comprises a compound of the formula $MR^3{}_m$ wherein M is aluminum, magnesium, or zinc, each $R^3$ is independently an alkyl radical of 1 to about 20 carbon atoms, and m corresponds to the valence of M.

30. The catalyst of claim 26 wherein component (1) (c) (i) comprises a compound of the formula $Mg(OR^1)_n(OR^2)_{2-n}$ wherein $R^1$ and $R^2$ are identical or different hydrocarbyl radicals of 1 to about 20 carbon atoms and n ranges from 0 to 2.

31. The catalyst of claim 26 wherein the pretreatment modifier comprises sulfuric acid, fuming sulfuric acid, chlorosulfonic acid, hydrogen sulfide, benzoic acid, a $C_1$ to about $C_6$ alkyl benzoate or halobenzoate, or a mixture thereof.

32. The catalyst of claims 1 and 14 wherein the organoaluminum compound (A) comprises a trialkylaluminum containing 2 to about 12 carbon atoms per alkyl radical.

33. The catalyst of claim 32 further characterized in that said catalyst comprises at least one crystallinity promoter.

34. The catalyst of claim 33 wherein the organoaluminum compound (A) comprises triethylaluminum.

35. A propylene polymerization catalyst comprising (A) triethylaluminum, triisobutylaluminum or mixture thereof and (B) a solid, titanium-containing component formed by
 (1) ball-milling the solid reaction product comprising
  (a) titanium tetrachloride
  (b) ethylbenzoate or benzoyl chloride
  (c) a hydrocarbon-insoluble, magnesium-containing pretreatment product comprising
   (i) magnesium ethoxide;
   (ii) triethylaluminum;
   (iii) chlorosulfonic acid; and
   (iv) methyl benzoate; and
 (2) retreating such ball-milled product with
  (a) titanium tetrachloride;
  (b) carbon tetrachloride, 1,1,2-trichloroethane or pentachloroethane; and
  (c) ethyl benzoate, ethyl anisate or methyl-p-toluate.

36. A process for preparing a catalyst component useful in polymerization of alpha-olefins comprising
 (A) contacting components comprising (1) at least one magnesium alcoholate, and (2) at least one Group II or IIIA metal alkyl in amounts such that the atomic ratio of metal in (2) to metal in (1) ranges from about 0.001:1 to about 1:1;
 (B) removing unreacted Group II or IIIA metal component from the product of (A) to form a solid, hydrocarbon-insoluble, magnesium-containing pretreatment product;
 (C) contacting said pretreatment product with components comprising at least one titanium(IV) halide or haloalcoholate and at least one organic electron donor containing at least one of oxygen, nitrogen, sulfur and phosphorus, in amounts such that the atomic ratio of titanium to metal in (A) (1) is at least about 0.5:1 and the ratio of organic electron donor to titanium ranges from about 0.001 to about 1 mole per gram-atom, to form a solid catalyst component;
 (D) comminuting the resulting product; and
 (E) retreating the comminuted product by contacting such product with components comprising at least one titanium(IV) halide or haloalcoholate, at least one chlorocarbon and at least one carboxylic organic acid ester in amounts such that the atomic ratio of retreatment titanium to titanium contained in the comminuted product is about 50:1 to about 500:1, the ratio of moles or organic acid ester to gram-atom of titanium contained in the comminuted product is about 0.5:1 to about 10:1, and the moles of chlorocarbon to gram-atom of titanium contained in the comminuted product is about 40:1 to about 500:1.

37. The process of claim 36 wherein the step of comminuting is by ball-milling.

38. The process of claim 37 wherein retreatment titanium compound is titanium tetrachloride.

39. The process of claim 38 wherein retreatment organic acid ester is ethyl benzoate, ethyl anisate or methyl-p-toluate.

40. The process of claim 38 wherein retreatment chlorocarbon is carbon tetrachloride, 1,1,2-trichloroethane or pentachloroethane.

41. The process of claims 38 or 39 wherein components in (A) further include at least one pretreatment modifier from the group consisting of mineral acids and anhydrides of sulfur; organometallic chalcogenide derivatives of hydrogen sulfide in which each hydrogen is replaced by an organosilicon, organogermanium or organotin group wherein the organic radicals are selected from the group consisting of phenyl, alkyl-substituted phenyl, phenyl-substituted alkyl and alkyl radicals, said alkyl radicals containing 1 to about 6 carbon atoms; organic acids containing 1 to about 20 carbon atoms and 1 to about 4 carboxyl groups; and $C_1$ to about $C_{12}$ alkyl and haloalkyl and $C_6$ to about $C_{10}$ aryl and haloaryl esters of said organic acids.

42. The process of claim 41 wherein (A) is conducted in the presence of at least one alpha-olefin.

43. The process of claim 41 further characterized in that said solid catalyst component is contacted with at least one liquid Lewis acid having a high enough Lewis acidity to remove impurities from the surface of said solid.

* * * * *